United States Patent [19]

Bowman

[11] 3,828,702

[45] Aug. 13, 1974

[54] RICE FARMING IMPLEMENT

[75] Inventor: David N. Bowman, Newport, Ark.

[73] Assignee: Morris L. Bowman, Newport, Ark.; a part interest

[22] Filed: May 16, 1972

[21] Appl. No.: 253,823

[52] U.S. Cl............... 111/52, 111/85, 172/178
[51] Int. Cl............................................. A01c 5/00
[58] Field of Search............ 111/85, 87, 88, 52, 63, 111/61, 10, 8; 172/178, 600, 620, 197, 200, 178, 174

[56] References Cited
UNITED STATES PATENTS

| | | | |
|---|---|---|---|
| 1,029,154 | 6/1912 | Townsend | 172/620 |
| 2,643,623 | 6/1953 | Soss | 111/61 |
| 3,177,828 | 4/1965 | Cramer | 111/52 |
| 3,223,178 | 12/1965 | Clifford | 172/600 X |
| 3,610,185 | 10/1971 | Scarborough | 111/85 X |

Primary Examiner—Stephen C. Pellegrino
Attorney, Agent, or Firm—Hofgren, Wegner, Allen, Stellman & McCord

[57] ABSTRACT

A farm implement particularly adapted for rice farming for increasing the productivity of rice fields by allowing the cultivation of land immediately adjacent the levees in a rice field. The implement includes a frame adapted to be connected to a tractor and mounts, from front to rear, a disc gang, a seeder and a harrow. The disc gang is arranged so that one end thereof is lower than the other end thereof to fill the furrows customarily generated during the formation of levees so as to allow seeding by the seeder and smoothing by the harrow, all in a single pass of the implement.

4 Claims, 5 Drawing Figures

RICE FARMING IMPLEMENT

BACKGROUND OF THE INVENTION

This invention relates to farm implements, and more particularly, to implements suited for rice farming and increasing the productivity of rice fields by filling, seeding, and smoothing the furrows adjacent the levees normally interposed between adjacent rice fields.

The most pertinent prior art known to the applicant includes U.S. Pat. Nos. 2,643,623 to Soss; 839,532 to Wilhelm; 2,831,443 to Walsh; 1,971,278 to Schurmann; and 710,832 to Ansley.

Typically, in rice farming, a large area to be farmed is divided into a plurality of smaller rice fields by levees. The levees are, of course, required to hold water on the fields for a prolonged period to allow rice seeds to germinate, etc.

The number and location of the levees is principally dependent upon the contour of the land to be farmed with levees separating adjacent fields also serving to maintain a difference in the water level between adjacent fields for the purpose of allowing rice farming with a minimum amount of water and for allowing the farmer to optimize the water level in each field.

Typically, the levees are formed by a plow-like implement having a pair of mold boards oriented with respect to each other so as to drive earth towards a central space between the two mold boards. As a result, two deep furrows will be present on opposite sides of each levee.

Heretofore, it has been extremely difficult to make use of the land area within the furrows for production purposes. Seeding such furrows is extremely difficult and, frequently, the water depth at the furrows is such that such rice seeds as may be planted therein will not properly germinate and mature. As a result, a substantial portion of the land area defined by furrows is lost to production such that the yield of a given field is proportionately decreased.

The problem is, of course, intensified on land contours requiring a substantial number of levees.

SUMMARY OF THE INVENTION

It is the principal object of the invention to provide a new and improved farm implement particularly suited for rice farming which will allow full cultivation of the land area defined by furrows adjacent levees so as to increase productivity of a given area of land. More particularly, it is an object of the invention to provide such an implement wherein means are provided for filling the furrow, seeding the filled furrow and thereafter smoothing the ground, all in a single operation.

The exemplary embodiment of the invention achieves the foregoing object by means of a construction including a frame which is adapted to be connected to a prime mover such as a tractor, and preferably to the conventional three-point hitch normally present on tractors. The frame includes opposed sides and extending across the sides is a driven seeding device for distributing rice seed across the area traversed by the frame when pulled by a tractor. A front part of the frame mounts a disc gang in such a way that the disc gang will have one end lower than the other for the purpose of directing dirt adjacent a furrow into the furrow to fill the same. According to the preferred embodiment, the disc gang is mounted on the frame by means of a cross member having one end pivotally connected to the frame and mounting a plurality of downwardly extending members which engage the disc gang. The endmost downwardly extending member adjacent the pivot is made of longer length than the remaining ones so that, as the implement is used, the aforementioned end of the disc gang is lower than the opposite end to achieve filling.

A hydraulic cylinder is interposed between the frame and the pivotal cross member for pivoting the same about the pivot point so as to change the angle to attack of the disc gang to thereby permit control of the amount of dirt being moved into a furrow, particularly, when the impelement turns corners or the like.

The frame includes a rearwardly extending member which, in turn, is flexibly connectd to a harrow defined by a plurality of cross members having downwardly extending teeth and interconnected by a plurality of links. This construction allows the entire implement, including the harrow, to be lifted well above the terrain on which a tractor is moving through operation of the three-point hitch thereon.

Other objects and advantages will become apparent from the following specification taken in conjunction with the accompanying drawings.

DESCRIPTION OF THE PREFERRED EMBODIMENT

Figure 1:
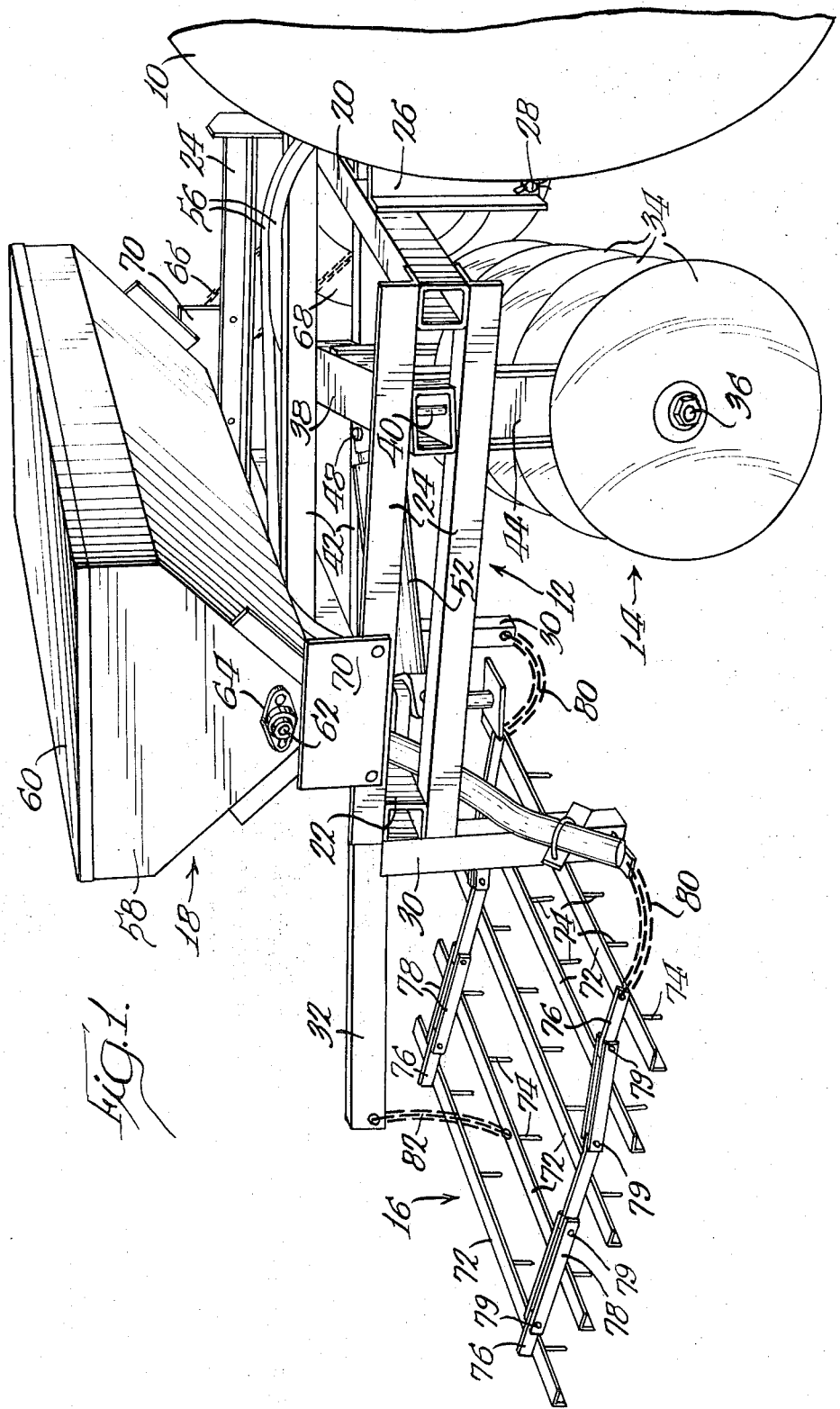
FIG. 1 is a perspective view of an implement made according to the invention.

With reference to FIG. 1, an exemplary embodiment of the invention is illustrated as trailing a tractor, only a portion of a wheel 10 of which is shown, and is seen to include a frame, generally designated 12, mounting, near its forward end, a disc gang, generally designated 14, at its rear end, a harrow, generally designated 16, and intermediate the disc gang 14 and the harrow 16, a seeding device, generally designated 18.

The frame 12 is defined by a front tubular cross member 20, a rear tubular cross member 22 and opposed sides each defined by a pair of angle irons 24 extending between and sandwiching the cross members 20 and 22.

The front cross members mount depending brackets 26 (only one of which is shown) for attachment to pins 28 associated with the customary three-point hitch of the tractor drawing the implement.

Depending frame members 30 are located at the rear of the frame 12 and, along with a rearwardly extending frame member 32, serve to pull the harrow 16 in tandem with the remainder of the implement.

The disc gang 14 is comprised of a plurality of discs 34 which are mounted for rotation about an axis defined by a rod 36 in a conventional fashion. The disc gang 14 is secured to the frame 12 by means of a tubular cross member 38 pivotally secured at one end to the side of the frame defined by one pair of the angle irons 24 by a pivot pin 40. The opposite end of the cross member 38 is slidably received in the frame 12 by reason of its being received in a pair of tubular frame members 42 which generally extend the length of the frame. If desired, a continuation of one of the frame members 42 may comprise the rearwardly extending frame member 32.

Figure 3:
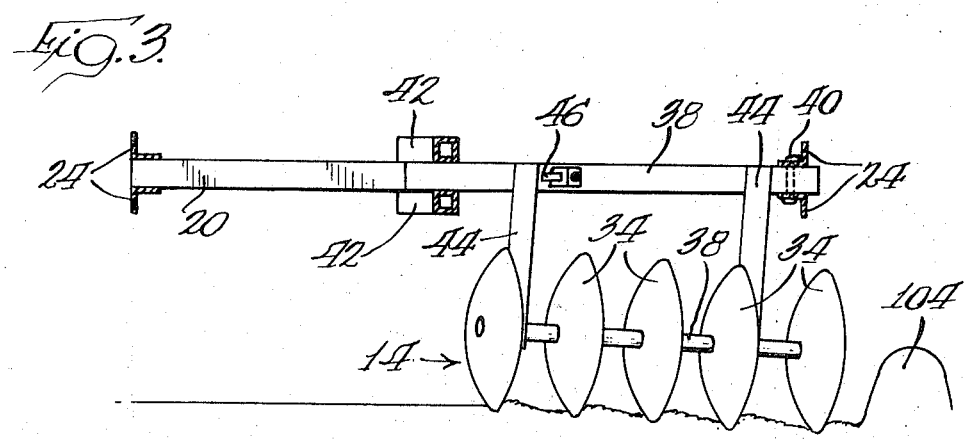
FIG. 3 is a somewhat schematic vertical section taken approximately along the line 3—3 of FIG. 2.

The cross member 38 mounts a pair of downwardly extending structural members 44 which, by any suitable means, at their lower end, rotatably mount the disc gang 14. The arrangement is such that in operation, the end of the disc gang 14 underlying the pivot pin 40 will be lower than the opposite end thereof. This arrangement can be accomplished in a variety of ways but the preferred embodiment contemplates that the rightmost structural member 44, as illustrated in FIG. 3, be longer than the leftmost one of the structural members 44 so that, in operation, the frame 12 may be disposed in a generally horizontal plane for ease of connection to the tractor.

The cross member 38 also includes, at a point remote from the pivot pin 40, a rearwardly extending tongue 46 which, by means of a pivot pin 48, is pivotally connected to the piston rod 50 of a hydraulic cylinder 52. The opposite end of the hydraulic cylinder 52 may be pivotally connected by a pivot pin 54 extending between a pair of spaced ears 56 (only one of which is shown) extending forwardly from the rear cross member 22.

Figure 2:
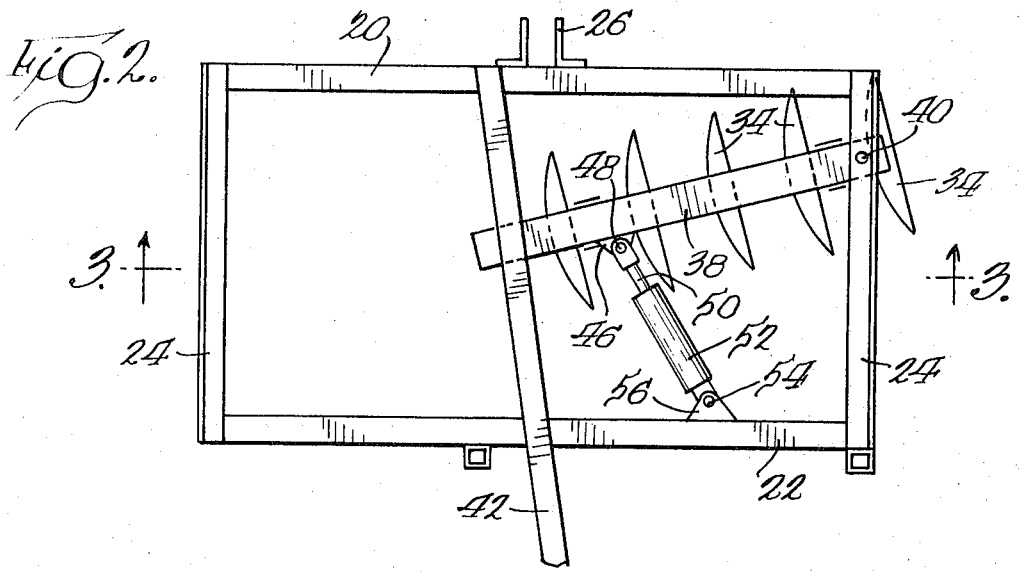
FIG. 2 is a somewhat schematic plan view of a portion of the implement.

The cylinder 52 may be operated through hydraulic lines 56 extending to the cylinder 52 from the usual source of hydraulic fluid under pressure found on tractors to pivot the cross bar 38 about the pivot axis defined by the pin 40 to thereby change the angle of attack of the disc gang 14. For example, as viewed in FIG. 2, if the piston 50 is extended, the angle of attack of the disc gang 14 will be decreased with the result that during movement of the implement, a lesser amount of earth will be moved to the right. On the other hand, if the piston 50 is retracted, a greater amount of earth may be moved to the right as viewed in FIG. 2.

Returning now to FIG. 1, the seeder 18 may be of conventional construction and includes a hopper 58 provided with a removable cover 60 and which may receive rice seed for ultimate distribution thereby across the path traversed by the implement. Conventionally, the seeder 18 will include an internal, rotary feeding means mounted on a shaft 62 received in external bearings 64. On the end of the shaft 62, not illustrated in FIG. 1, a sprocket may be provided and via a drive chain 66, may be connected to another sprocket (not shown) driven by a wheel 68 journaled on the vehicle frame 12. Thus, as the implement is moved over the ground with the wheel 68 in engagement therewith, the seeder 18 will be operative to distribute seed across the entire width of the frame 12 in the path traversed thereby. The seeder may be mounted on the frame by any suitable means. As illustrated, a pair of side plates 70 secured to the upper ones of the angle irons 24 in each pair are employed.

The harrow 16 is made up of a plurality of angle irons 72, each extending in a direction transverse to the length of the frame 12 and each mounting a plurality of depending teeth 74. Opposite sides of each angle iron 72 are connected to others of the angle irons by links 76 and link pairs 78. The links 76 and link pairs 78 alternate from one angle iron 72 to the next with each link being received between the links of the adjacent link pair and secured thereto by a pivotal connection defined by a pivot pin 79. The links 76 and link pairs 78 are secured to associated ones of the angle irons 72 by any suitable means as, for example, by welding, and the forwardmost links 76 are connected via a chain 80 to the lowermost ends of the depending frame members 30 and the chains 80 serve to draw the harrow 60 when the implement is in motion.

In the illustrated embodiment, five angle irons 72 are employed in the harrow and the fourth angle iron (from the front) is connected via a chain 82 to the rearwardmost extremity of the frame member 32. In normal operation, the chain 82 is unnecessary.

Preferably, the length of the chains 80 and 82 are such that when the entire implement is elevated through conventional operation of the three-point hitch of the tractor drawing the same. The chain 82 is such as to elevate the second through fifth ones of the angle irons 72 well above the ground while the chains 80 will serve to elevate the forwardmost angle iron 72 well above the ground so that the implement may be easily transported from one location to another.

Figure 4:
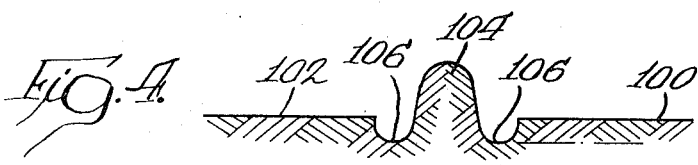
FIG. 4 is a cross-sectional view of a levee between two rice paddies prior to use of an implement made according to the invention.
Figure 5:
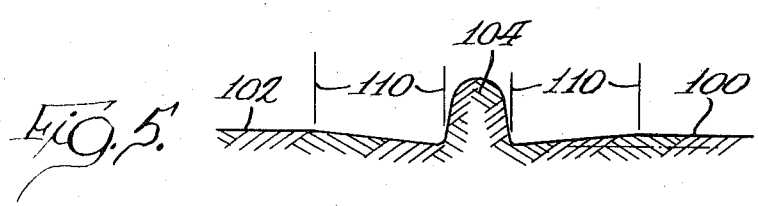
FIG. 5 is a cross section of a levee between rice fields after use of an implement made according to the invention.

With reference now to FIGS. 3, 4 and 5, operation of the implement will be described. Referring particularly to FIG. 4, the typical condition of a rice field at a levee prior to use of the implement of this invention is illustrated and it will be seen that adjacent rice fields 100 and 102 are separated by an upright levee 104 formed of earth by a pair of opposed mold boards with the result that deep furrows 106 exist immediately adjacent both sides of the levee 104 and separate the same from respective fields 100 and 102. As generally alluded to previously, it is difficult to adequately seed the land area defined by the furrows 106 and, even if seeded, conditions therein may result in the depth of water when the fields are flooded sufficient to preclude any substantial germination of growing of rice at such areas. Thus, a certain amount of the land within each levee is nonproductive and as the number of levees required for any given area increases, a greater proportion of nonproductive land results.

The invention may be used to make such areas productive and accomplish this result in a single pass. In particular, a tractor may draw the implement of the invention along one side of the levee with the side of the frame having the pivot pin 40 for the disc gang 14 adjacent the levee. Since the end of the disc gang 14 adjacent the pivot pin 40 is lower than the opposite end and will be adjacent the levee 104, a certain amount of the earth in the field 100 or 102 inwardly of the furrows 106 will be moved in the appropriate direction to fill the furrow 106 as illustrated by a slight sloping area demarked by lines 110 in FIG. 5. As a result, the fields 102 and 100 are substantially leveled completely to the levee 104 by operation of the disc gang 14. Since such leveling takes place prior to the pass of the seeder 18 by reason of the disc gang 14 being located forwardly on the frame of the seeder, the leveled land is subsequently seeded and thereafter harrowed by the harrow 16. Thus, in a single pass, one of the furrows 106 may be filled, the resulting filled land seeded by the seeder and the seeded land smoothed by action of the harrow 16.

The movable mounting of the disc gang 14 provides for variable filling action depending upon the depth of the furrows 106 as well as changes in filling requirements caused by bends in the levees. In the specific form of the invention illustrated, a right turn would result in little or no earth being moved to the furrow while a left turn would result in overfilling of the furrow if the disc gang 14 were fixed. However, by reason of its movable mount allowing the changing of the angle of the tack of the discs, uniform filling can be accomplished regardless of furrow depth or levee shape.

From the foregoing, it will be appreciated that the invention allows full use of all of the land in a rice field within the surrounding levees for full production growing of rice and provides the further advantage of allowing furrow filling, seeding and ground smoothing in a single operation.

I claim:

1. An implement for use in rice farming, and particularly the areas of a rice paddy immediately adjacent a levee, comprising: means defining a vehicle frame having a forward end adapted to be secured to a tractor or the like, a pair of opposed sides and a rear end; means defining a disc gang; means securing said disc gang to said frame adjacent the forward end thereof, such that an end thereof is adjacent one of said frame sides and said end of said disc gang will be lower than the opposite end of said disc gang when said implement is in use; seed feeding means extending across said frame and located to the rear of said disc gang for feeding seed to the ground over which said implement may be operated behind said disc gang; and harrow means affixed to the rear end of said frame means behind said seed feeding means for smoothing the ground after it has been seeded by said feed seeding means; whereby said implement permits full use of a rice paddy by said disc means filling the furrow adjacent the levee, said seed feeding means seeds the filled furrow adjacent the levee and said harrow means smoothes the filled and seeded furrow; said securing means comprising a cross member having one end pivotally secured to said frame one side and its opposite end slidably received in said frame, and at least two downwardly extending members secured to said cross member and to said disc gang, said downwardly extending members being spaced across the width of said frame with the downwardly extending member nearest said frame one side being longer than the other of said downwardly extending member; and power means connected to said frame and to said cross member for pivoting the latter relative to the frame for selectively altering the angle of attack of said disc gang on the ground over which the implement may be operated.

2. An implement according to claim 1 wherein said power means comprises a hydraulic cylinder connected to said frame and to said cross member and said opposite end of said cross member is slidably received between a pair of spaced frame members extending generally in the direction of the length of said frame.

3. An implement for use in rice farming, and particularly the areas of a rice paddy immediately adjacent a levee, comprising: means defining a vehicle frame having a forward end adapted to be secured to a tractor or the like, a pair of opposed sides and a rear end; means defining a disc gang; means securing said disc gang to said frame adjacent the forward end thereof, such that an end of said disc gang adjacent one of said frame sides will be lower than the opposite end of said disc gang when said implement is in use, said disc gang further being angularly mounted on said frame with respect to said frame forward and rear ends so as to have said end thereof forwardly of the other end of said disc gang whereby earth will be moved toward said one frame side; seed feeding means extending across said frame and located to the rear of said disc gang for feeding seed to the ground over which said implement may be operated behind said disc gang; and harrow means affixed to the rear end of said frame means behind said seed feeding means for smoothing the ground after it has been seeded by said seed feeding means; whereby said implement permits full use of a rice paddy by said disc means filling the furrow adjacent the levee, said seed feeding means seeds the filled furrow adjacent the levee and said harrow means smoothes the filled and seeded furrow, said frame further including an elongated frame member extending rearwardly from the end of said frame and said harrow means comprising a plurality of cross members elongated generally in a direction transverse to the length of said frame, each of said cross members mounting a plurality of downwardly extending teeth, and a plurality of links connected to each other and to said cross members and extending in a direction along the length of said implement, and means flexibly interconnecting said harrow means and said rearwardly extending member whereby when said implement is connected to the three-point hitch of a tractor or the like, elevation of the implement operation of the tractor's three-point hitch will result in said harrow means being substantially elevated above the terrain over which the implement is moving.

4. An implement for use in rice farming, and particularly the areas of a rice paddy immediately adjcent a levee, comprising: means defining a vehicle frame having a forward end adapted to be secured to a tractor or the like, a pair of opposed sides and a rear end; means defining a disc gang; means securing said disc gang to said frame adjacent the forward end thereof, such that an end of said disc gang adjacent one of said frame sides will be lower than the opposite end of said disc gang when said implement is in use, said disc gang further being angularly mounted on said frame with respect to said frame forward and rear ends so as to have said end thereof forwardly of the other end of said disc gang whereby earth will be moved toward said one frame side; seed feeding means extending across said frame and located to the rear of said disc gang for feeding seed to the ground over which said implement may be operated behind said disc gang; and harrow means affixed to the rear end of said frame means behind said seed feeding means for smoothing the ground after it has been seeded by said seed feeding means; whereby said implement permits full use of a rice paddy by said disc means filling the furrow adjacent the levee, said seed feeding means seeds the filled furrow adjacent the levee and said harrow means smoothes the filled and seeded furrow, said frame mounting at least one ground engaging wheel, all said wheels being remote from said frame one side; and said disc gang one end extends at least to said frame one side whereby said implement may be operated in virtual abutment with a levee to completely fill, seed, and smooth the adjacent furrow.

* * * * *